United States Patent
Orbaek White et al.

(10) Patent No.: US 11,970,398 B2
(45) Date of Patent: Apr. 30, 2024

(54) PROCESS FOR REUSE OF PLASTIC THROUGH THE CONVERSION TO CARBON NANOMATERIALS

(71) Applicant: Trimtabs Ltd, Swansea (GB)

(72) Inventors: Alvin Orbaek White, Swansea (GB); Ali Hedayati, Molndal (SE)

(73) Assignee: Trimtabs Ltd, Swansea (GB)

( * ) Notice: Subject to any disclaimer, the term of this patent is extended or adjusted under 35 U.S.C. 154(b) by 1329 days.

(21) Appl. No.: 16/435,475

(22) Filed: Jun. 8, 2019

(65) Prior Publication Data
US 2019/0375639 A1 Dec. 12, 2019

Related U.S. Application Data

(60) Provisional application No. 62/682,291, filed on Jun. 8, 2018.

(51) Int. Cl.
*C01B 32/162* (2017.01)
*B01J 31/22* (2006.01)
*B09B 3/40* (2022.01)

(52) U.S. Cl.
CPC ......... *C01B 32/162* (2017.08); *B01J 31/2295* (2013.01); *B09B 3/40* (2022.01); *B01J 2231/005* (2013.01); *B01J 2531/842* (2013.01); *C01B 2202/36* (2013.01); *C01P 2002/82* (2013.01); *C01P 2002/88* (2013.01); *C01P 2004/03* (2013.01)

(58) Field of Classification Search
None
See application file for complete search history.

(56) References Cited

U.S. PATENT DOCUMENTS

2006/0062714 A1* 3/2006 Tang .................. B82Y 40/00
423/445 R
2006/0115409 A1 6/2006 Li et al.

FOREIGN PATENT DOCUMENTS

WO 2010111624 A1 9/2010
WO 2017060843 A1 4/2017

OTHER PUBLICATIONS

Annu et al., Carbon nanotube using spray pyrolysis: Recent scenario, Journal of Alloys and compounds, 2017, 970-982 (Year: 2017).*
Li et al., Direct spinning of carbon nanotube fibers from chemical vapor deposition synthesis, Science, 304, 2004 (Year: 2004).*

(Continued)

*Primary Examiner* — Coris Fung
*Assistant Examiner* — Keling Zhang
(74) *Attorney, Agent, or Firm* — Patterson + Sheridan, LLP (57) ABSTRACT

The present disclosure provides methods for the conversion of a solution or suspension of polymers, plastics, and other carbon-containing waste materials in the presence of a metal containing catalyst into carbon nanotubes. The method includes steps of mixing the polymer and metallic catalyst in a suitable solvent and injecting the mixture into a heated zone of a chemical vapor deposition (CVD) reactor to produce carbon nanotubes (CNTs). Advantages of the present disclosure include ease of use, the potential use of a wide range of plastics that cannot be recycled or upcycled by traditional methods, and the ability to use waste hydrocarbon solvents to dissolve the plastic, or to use as a carbon source.

19 Claims, 8 Drawing Sheets

(56) References Cited

OTHER PUBLICATIONS

Vayer et al., New insights into polymer-solvent affinity in thin films, European polymer journal, 2017, 93, 132-139 (Year: 2017).*
Puengjinda et al., Selective synthesis of carbon nanotubes and nanocapsules using naphthalene pyrolysis assisted with ferrocene, Journal of Industrial and Engineering Chemistry, 2009 (Year: 2009).*
International Preliminary Report on Patentability for International Application No. PCT/IB2019/054792 dated Dec. 17, 2020.
International Search Report and Written Opinion for Application No. PCT/IB2019/054792 dated Oct. 1, 2019.
First Examination Report for Indian Application No. 202147000167 dated Mar. 17, 2021.

* cited by examiner

PROCESS FOR REUSE OF PLASTIC THROUGH THE CONVERSION TO CARBON NANOMATERIALS

CROSS-REFERENCE TO RELATED APPLICATIONS

This application claims benefit of U.S. provisional patent application Ser. No. 62/682,291, filed Jun. 8, 2018, which is herein incorporated by reference in its entirety.

BACKGROUND

Field

Embodiments of the present disclosure generally relate to a process for the conversion of carbon containing waste into carbon nanomaterials, for example, carbon nanotubes.

Description of the Related Art

Plastics are the general term for a wide range of organic compounds that are malleable and are capable of being molded into solid objects. Plastics are typically organic polymers of high molecular mass and often contain other substances such as fillers and color chemicals. Plastics are usually synthetic and derived from petrochemicals.

The world production of plastics in 2011 reached a record high of 280 million tons, roughly two-thirds of which were contributed jointly by China (~23%), the European Union (EU-21%), the USA (16%), and Japan (5%). As a consequence, more than 28, 25, 13, and 9 million tons of plastic wastes were generated, respectively.

The use of polymers is currently widespread and has many advantages over traditional materials such as wood and metal; however, due to their stability and nonbiodegradable nature, polymers pose challenging issues to the environment and ecosystems. As most polymers are low-priced, they are readily discarded after use, commonly through landfilling.

Negative aspects of landfilling include continuously decreasing available landfill space and littering which causes land and water pollution. The accumulation of plastic refuse in the North Atlantic Subtropical Gyre, as well as the Great Pacific Garbage Patch, where the amount of non-biodegradable wastes (such as plastics and rubber) has increased more than 100 times in the past 40 years, has created a significant environmental burden. Thus, recycling and reuse are concepts fundamental to addressing the problem of global pollution.

Recycling is a process utilized to collect waste materials, process or re-manufacture them into new products through biological, mechanical, chemical, or thermal processes, and to market those products (making the wastes recycled). Biological recycling takes place at the presence of microorganisms, such as bacteria, fungi, and enzymes, to degrade the plastics, whereas mechanical-, chemical- and thermal-recycling are human activity based.

Mechanical recycling processes plastic wastes, predominantly thermoplastics, into secondary raw material (termed recyclate) for common plastics. No significant changes in the chemical structures occur during mechanical recycling. Mechanical recycling processes start with materials collection, followed by identification, sorting, grinding, washing, drying, separating, agglomerating, extruding/compounding, and eventually pelletizing. Thermal recycling takes advantage of the high energy content of the plastic wastes, and recovers the energy through thermal processes. Chemical (or feedstock) recycling partially converts some plastics into their monomers, or into hydrocarbon fractions, which can then be used either as feedstock for polymerization, or in other chemical processes.

Mechanical recycling turns used consumer polymers into new polymer products. In contrast, thermal recycling releases the thermal energy contained within waste plastics through combustion; however, the associated carbon dioxide emissions present additional environmental problems. Chemical recycling converts waste polymers into feedstock for chemicals, materials, and fuels production.

While conventional recycling can be utilized to improve ecological outcomes, limitations with conventional methods still exist. For example, containers made from a single type and color of plastic make them relatively easy to sort, however, a consumer product like a cellular phone may have many small parts consisting of over a dozen different types and colors of plastics. In such cases, the resources it would take to separate the plastics far exceed their value and the item is often discarded without being recycled.

Moreover, recycling certain types of plastics can be unprofitable. For example, polystyrene is rarely recycled because the process is typically not cost effective or economically viable. These un-recycled wastes are typically disposed of in landfills, incinerated or used to produce electricity at waste-to-energy plants.

Plastics that are normally difficult to recycle include: PVC plastic wraps, some cooking oil containers, peanut butter jars, blister packs, window cleaner and detergent bottles, shower curtains, vinyl pipes, flooring and home siding, styrofoam cups & plates, clamshell carry-out containers, foam egg cartons, building insulation, disposable cutlery, some over-the-counter medicine cases and CD cases, plastic baby bottles, sippy cups, 3- and 5-gallon water jugs, lids, sunglasses, Nylon signs, medical storage containers, some plastic cutlery, any toys or electronics that are partly constructed from plastic containing materials. Various examples of such materials are described in the following examples.

Phenolics or phenol formaldehyde (PF) are high modulus, relatively heat resistant, and excellent fire resistant polymers used for insulating parts in electrical fixtures, paper laminated products, and thermal insulation foams. However, such materials are typically dark colors (red, green, brown) and often thermoset, which increases the difficulty of recycling.

PVC is a soft, flexible plastic used to make clear plastic food wrapping, cooking oil bottles, children's and pets' toys, and blister packaging for consumer products, among other products. PVC is commonly used as the sheathing material for computer cables, and to make plastic pipes and parts for plumbing. PVC contains numerous toxins, which can leach throughout the entire life cycle of the material. Almost all products using PVC require virgin material for their construction; less than 1% of PVC material is recycled. Products made using PVC plastic are generally not considered to be recyclable, which greatly contributes to the environmental burden of such materials.

Polystyrene is an easily-formed plastic used to make disposable styrofoam drinking cups, take-out "clamshell" food containers, egg cartons, plastic picnic cutlery, and foam packaging. Polystyrene is also widely used to make rigid foam insulation and underlay sheeting for laminate flooring used in home construction. Because polystyrene is structurally weak and ultra-lightweight, it breaks up easily and is dispersed readily throughout the natural environment. Beaches all over the world have bits of polystyrene lapping at the shores, and an untold number of marine species have ingested this plastic with immeasurable consequences to their health. Polystyrene may leach styrene, a possible human carcinogen, into food products (especially when heated in a microwave). Chemicals present in polystyrene have been linked with human health and reproductive system dysfunction. Recycling is not widely available for polystyrene products and it accounts for approximately 35% of US landfill material.

Even plastics and polymer materials which are considered to be recyclable can be rendered unrecyclable if sufficient care is not utilized during the recycling process. For example, one dirty product, such as a plastic container with food waste still in it, can contaminate an entire bale, thus containing thousands of pounds of collected plastics. Such contamination can cause thousands of recyclable items to go to a landfill instead of being recycled.

Urea formaldehyde resin is a thermosetting plastic whose chemical structure makes it virtually impossible to recycle. Thermosetting plastics cannot be recycled by thermal recycling methods because the molecular bonds that bind the material together burn instead of melting, thus making such materials environmentally taxing.

Upcycling is another process by which materials are reused, or components of the original material are reused. In particular, upcycling typically results in a product of higher value than the original material. For example, an upcycled material may have higher quality properties than the original material. As a result, upcycled materials are made to have enhanced properties compared with the original materials.

However, as recycled plastics often have compromised properties, such materials cannot be used in their original applications. Moreover, identifying high-capacity markets for recycled products is problematic, thus creation of a new market for recycled, and/or upcycled plastics, particularly leading to high-value products, would be desired to spur interest in recycling, upcycling, and reuse of such plastic materials and polymers.

In addition, paints and solvent-based coatings are often difficult to recycle or dispose of. Such materials often contain higher levels of organic compounds than water-based coatings. These solvents or compounds facilitate application, drying and the formation of a durable, regular paint film. However, when these compounds evaporate, they release volatile organic compounds (VOCs) into the atmosphere resulting in a strong odor and toxic impact on the environment. While stricter environmental regulations have required paint manufacturers to dramatically reduce the levels of VOCs in their paints, they still represent 20% of paint the residential marketplace and the waste material is difficult to dispose of due to the solvents.

The various allotropes of carbon nanomaterials include buckminsterfullerene, graphene, multi walled carbon nanotubes and single walled carbon nanotubes. Single walled carbon nanotubes (SWCNTs) and multi walled carbon nanotubes (MWCNTs) are both cylindrical entities in which the crystal lattice remains unbroken along the length of the tubes.

Of the various methods of growth of carbon nanomaterials, those using a catalyst and hydrocarbon source are the most common. The choice of hydrocarbon can influence the nature of the product. The carbon source for CNT synthesis is usually a gaseous hydrocarbon such as methane, ethane, ethylene, or ethanol.

While the concept of synthesizing CNTs using solid polymers has been identified, various processes have also been explored for such conversions; however, conventional processes utilize thermal conversion (with or without a catalyst) of the polymer to a suitable feedstock that in turn is converted to CNTs through a secondary process. These two chemically distinct process steps may occur in-situ or stepwise.

A drawback of conventional processes is that significant thermal treatment is required to decompose the solid polymers prior to chemical conversion to CNTs. An additional drawback is that a solid char product is often formed that is a waste that must be disposed of.

Accordingly, what is needed in the art are improved methods and processes for making carbon nanomaterials.

SUMMARY

In one embodiment, a method of converting waste plastic to carbon nanotubes is provided. The method includes mixing a carbon-containing material and a metallic catalyst precursor with a solvent to form a mixture, injecting the mixture into a carrier gas stream and into a heater reaction vessel comprising a plurality of heating zones, heating the mixture at a first temperature of between about 100° C. and about 1000° C., heating the mixture at a second temperature of between about 400° C. and about 1000° C. to facilitate growth of carbon nanotubes, and removing the carbon nanotubes from the reaction vessel.

In another embodiment, a method of converting waste plastic to carbon nanotubes is provided. The method includes mixing waste plastic and ferrocene with a solvent to form a mixture, injecting the mixture into a carrier gas stream and into a quartz tube comprising a first heating zone and a second heating zone, heating the mixture at a first temperature of between about 100° C. and about 1000° C. in the first heating zone, heating the mixture at a second temperature of between about 400° C. and about 1000° C. in the second heating zone to facilitate growth of carbon nanotubes, and removing the carbon nanotubes from the reaction vessel.

In yet another embodiment, a method of converting waste plastic to carbon nanotubes is provided. The method includes mixing carbon-containing material and a metallic catalyst precursor with toluene to form a mixture, injecting the mixture into a carrier gas stream and into a reaction vessel comprising a first heating zone and a second heating zone, the first heating zone and the second heating zone disposed adjacent to one another along a length of a quartz tube, heating the mixture at a first temperature of between about 100° C. and about 1000° C. in the first heating zone, heating the mixture at a second temperature of between about 400° C. and about 1000° C. in the second heating zone to facilitate growth of carbon nanotube on the quartz tube within the second heating zone, and removing the carbon nanotubes from the reaction vessel.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

The present disclosure relates to the process for recycling plastic and other carbon containing waste, including plastic waste ordinarily unable to be recycled, for example black plastic, through conversion into carbon nanotubes (CNTs). In particular, the present disclosure relates to a solution-based process. In one embodiment, the process is operated as a continuous process. The present disclosure is not limited to plastics, as waste solvents, biofuels, paints, refrigerants, polymers, biopolymers, cellulosic materials, cardboard, and various other carbon containing materials may be used as feedstock in the process.

The term waste plastic, as utilized herein, is intended to include material that is unused in industrial manufacturing, post-manufacturing, or post-consumer. Plastics are the general term for a wide range of organic compounds that are malleable and moldable into solid objects. Plastics are typically organic polymers of high molecular mass and often contain other substances such as fillers and color chemicals. In the following description, it is understood that waste plastics may be substituted with waste polymers, paints, waste oils, plastic-coated paper and plastic-coated cardboard, among other carbon containing waste materials.

The disclosure provides methods for the production of carbon nanomaterials or nanotubes, which is advantageous for lowering the production cost by using unconventional hydrocarbon precursor chemicals, such as waste plastics and the like, instead of precursors derived from petroleum or natural gas. The disclosure also provides methods for recycling waste plastics, paints, and solvents that cannot be recycled by conventional processes. In addition, processes described here may utilize waste solvents as the polymer solvent for the carbon nanomaterial and CNT formation processes described herein. In further aspects, the disclosure provides a carbon nanotube producing method that grows carbon nanotube materials in a rapid low cost process that can easily be scaled to commercial or industrial scales where the processes are believed to provide significant economic and environmental benefits.

Conventional methods for converting solid polymers into carbon nanotubes are disadvantageous because pyrolysis of solid polymers is performed at high temperatures to form low molecular weight organic compounds that are used as the chemical precursors for CNT growth. The conventional pyrolysis processes result in incomplete use of the polymer and generate a waste stream of coke or char carbon. Contrary to conventional methodologies, the present disclosure provides a single step growth method to synthesize carbon nanotubes without the limitations of conventional methodologies.

Advantages of the present disclosure are derived from a solvent carrier mixed with a catalyst used for CNT growth. A carbon source is obtained directly from the polymers of waste plastics (or other carbon containing waste) and not from added hydrocarbons (such as methane and ethane, etc.) or the thermal decomposition of a solid polymer. A wide range of feedstock, which includes polymers, plastics, and paints, as well as plastic-cardboard or plastic-paper composites, may be used to prepare carbon nanotubes. The re-use of waste plastics may be combined with the re-use of solvents.

The present disclosure provides a method for growing carbon nanotubes from waste plastics and other waste polymers or polymer containing materials. The method involves the mixing of the plastic with a solvent and a catalyst precursor, injection of the mixture into a heated reactor with a flow of suitable carrier gas under conditions which facilitate carbon nanotube growth. The amount of plastic or other suitable carbon containing material used to obtain carbon nanotubes is between about 0.1 to 40% (w/w) in the solvent of choice, and may be varied depending on the type plastic used.

According to the present disclosure, any waste plastic that can be dissolved, dispersed, or suspended in a suitable solvent may be utilized as a feedstock. The choice of solvent may vary so long as the solvent does not substantially inhibit the growth of carbon nanotubes. In one embodiment, the dissolution, dispersion, or suspension process of the waste plastic in the solvent may be mechanically perturbed by stirring, mixing, extraction, and/or sonication. In another embodiment, the dissolution, dispersion, or suspension process of the waste plastic in the solvent may include heating.

Suitable plastics include, but are not limited to, polyvinyl chloride (PVC), polystyrene (PS), bisphenol A resins, low density polyethylene (LDPE), polypropylene (PP), polymer resins, polyurethane, elastomers, polyolefins, and cellulosic compounds. An advantage of the present disclosure is that plastics which are difficult to recycle by conventional processes or even unrecyclable are utilized as feedstock. For example, black plastics or plastics contaminated with organic matter such as food residue may be utilized as feedstock.

The term catalyst precursor is used to denote compounds whose decomposition results in the formation of metal species that act as catalysts for the growth of carbon nanotubes from carbon-containing precursor molecules. The catalyst precursor is selected based upon the miscibility with the solvent used to dissolve or suspend the plastic or other suitable carbon containing material.

Suitable catalyst precursors include, but are not limited to, metallocene molecules such as ferrocene ($Fe(C_5H_5)_2$), cobaltocene ($Co(C_5H_5)_2$), and nickelocene ($Ni(C_5H_5)_2$). In addition, the catalyst can include metal halide compounds such as iron chloride materials (e.g. $FeCl_3$ and $FeCl_2$), nickel chloride materials (e.g. $NiCl_2$), cobalt chloride materials (e.g. $CoCl_2$), and copper chloride materials (e.g. $CuCl_2$). In addition, the catalyst may include metal oxide materials, such as iron oxide materials (e.g. $FeO$, $Fe_2O_3$, and $Fe_3O_4$), nickel oxide materials (e.g. $NiO$ and $Ni_2O_3$), and cobalt oxide materials (e.g. $CoO$, $Co_2O_3$, and $Co_3O_4$). In addition, the catalyst can include metal nitrate compounds, including, but not limited to iron nitrate materials (e.g. $Fe(NO_3)_3$), cobalt nitrate materials (e.g. $Co(NO_3)_2$), and nickel nitrate materials (e.g. $Ni(NO_3)_2$). The catalyst compounds may also include metal acetylacetonate compounds, such as, but not limited to iron acetylacetonate ($Fe(C_5H_7O_2)_3$), nickel acetylacetonate ($Ni(C_5H_7O_2)_2$), cobalt acetylacetonate ($Co(C_5H_7O_2)_2$), gallium acetylacetonate ($Ga(C_5H_7O_2)_3$), and ruthenium acetylacetonate ($Ru(C_5H_7O_2)_3$). The amount of catalyst precursor, either as a mixture of metal sources, or as a single compound that is used to obtain carbon nanotubes is between about 0.0001 and about 50% (w/w) based on the amount of polymer used. More specifically, the amount of catalyst precursor is between about 0.01 and about 5% (w/w) based on the amount of polymer used.

The solvent, carbon containing material, and catalyst are mixed together to form a mixture. As described above, the carbon containing material is dissolved, dispersed, or suspended in the solvent and the catalyst is added to the solution, dispersion, or suspension, respectively, thus forming the mixture.

The process further involves injecting the mixture, in the form of a solution, dispersion, or suspension, into a heated reaction vessel at a temperature sufficient to decompose the polymer and activate the catalyst precursor to facilitate carbon nanotube growth. In one embodiment, a temperature suitable to promote decomposition of the polymer and activate the catalyst precursor is between about 400° C. and about 1000° C., such as between about 600° C. and about 900° C.

In one embodiment, the carrier gas, which is injected to the reaction vessel gas, is hydrogen diluted in a noble gas such as helium, argon, or can be made of hydrogen diluted with inert gasses such as nitrogen. The carrier gas flow rate is between about 0.001 L/min and about 5000 L/min, such as between about 0.05 L/min and about 10 L/min. The injection rate of the plastic and catalyst precursor solution to the reaction vessel is between 0.001 mL/min and about 10 mL/min, such as between about 1 mL/min and about 3 mL/min.

The processes described herein are solution based. Thus, such processes are highly suitable for continuous processing and not require operation as a batch reactor, which is beneficial for large-scale operations. For example, it contemplated that a continuous feed of the mixture into injector may be utilized which increases efficiency of the method and associated apparatus. Additionally, it is contemplated that CNT products may be collected using a corkscrew collection system to enable the continuous processing envisioned by the embodiments described herein.

Figure 1:
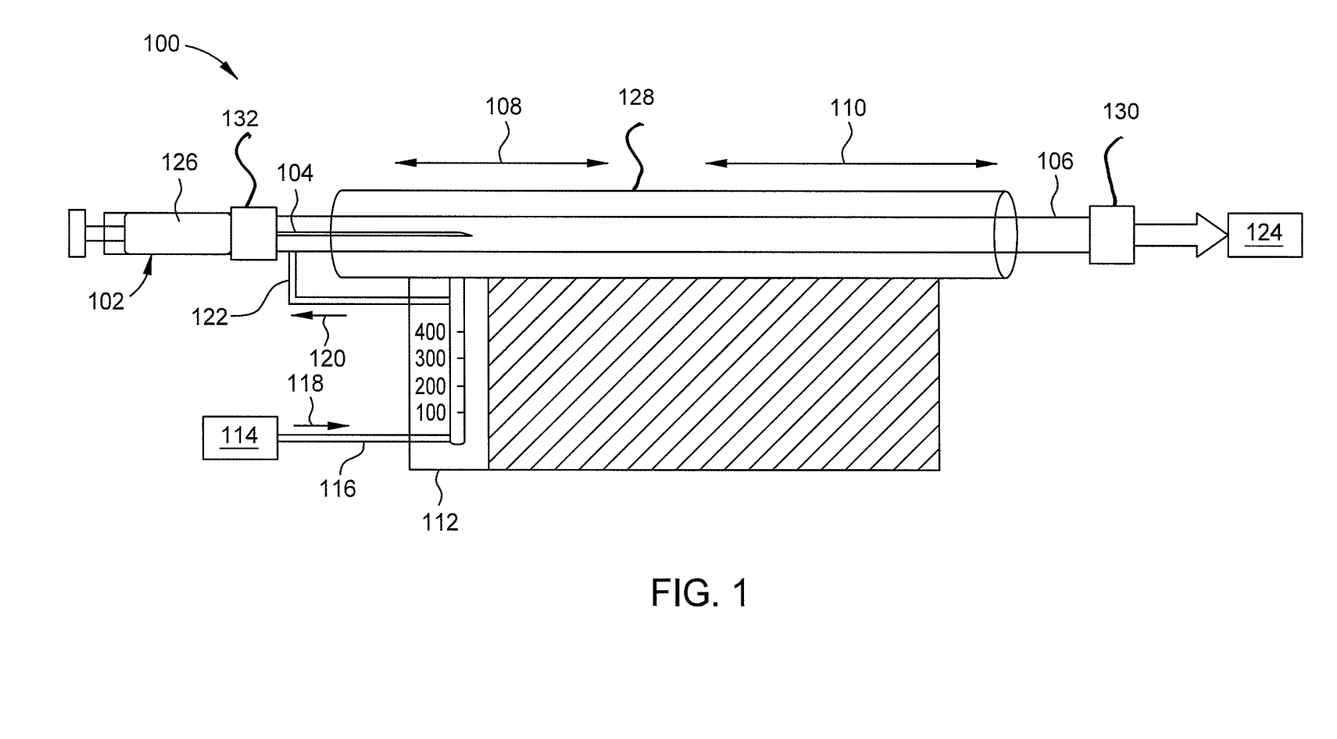
FIG. 1 illustrates a schematic of a reaction vessel according to an embodiment described herein.

FIG. 1 illustrates a schematic of a reaction vessel 100 according to an embodiment described herein. The reaction vessel 100, such as a liquid injection reactor (LIR) is illustrated as a table top horizontal tube reactor, however it is believed that commercial and industrial scale reactors may be fabricated according to the principles described herein. The reaction vessel 100 includes a separately controlled two-zone furnace 128 having a first zone 108 and a second zone 110. In the first zone 108, the solution of carbon source and catalyst is vaporized. In the second zone 110, the carbon nanomaterials are grown at high temperature. In one embodiment, carbon nanomaterial growth occurs on inside walls of the quartz tube 106 with the second zone 110. In this embodiment, the quartz tube 106 is a substrate for carbon nanomaterial growth. The furnace 128 includes heating coils, for example, 2.2 kW heating coils, capable of maintaining a stable temperature up to 1000° C. for both zones 108, 110 and a PID controller utilized to maintain the temperature within a range of ±0.1° C. from a set temperature.

The reaction vessel 100 also includes a gas flow controller 112. A quartz tube 106 is disposed within the furnace 128 and extends laterally within the furnace 128 such that the furnace surrounds the quartz tube 106. In one embodiment, a length of the quartz tube 106 is between about 500 mm and about 1,000 mm, such as between about 700 mm and about 800, mm, for example, about 760 mm. The quartz tube 106 has an inner diameter of between about 10 mm and about 50 mm, such as between about 30 mm and about 40 mm, for example, about 34 mm.

An injector 102, such as a syringe or the like, is coupled to the quartz tube 106 and in fluid communication with a volume of the quartz tube 106 via a needle 104. The needle 104 is fabricated from a metal, such as stainless steel, of a desired gauge, for example, 20 gauge or 26 gauge with a point style 2. The injector 102, includes a volume 126 which is loaded with the mixture (waste carbon material, solvent, and catalyst precursor). In one embodiment, the injector 102 is a micro pump capable of 0.01 mL/hr injection rate adjustment. In this embodiment, the micro pump injects the mixture through the needle 104 into the quartz tube 106. In another embodiment, a micro pump is utilized to fill the volume 126 of the injector 102 prior to injection of the mixture to the quartz tube 106 The injector 102 is connected to the quartz tube 106 via a first coupling 132 and the needle 104 extends from the injector 102 through the first coupling 132 and into the volume of the quartz tube 106. In one example, the needle 104 extends a distance into the quartz tube 106 corresponding to the first zone 108. As such the first coupling 132 is disposed adjacent to and may define a terminus of the first zone 108.

A second coupling 130 is connected to the quartz tube 106 opposite the first coupling 132. The second coupling 130 enables connection to an exhaust 124 and the second coupling 130 may define a terminus of the second zone 110. In certain embodiments, both of the first coupling 132 and the second coupling 130 are stainless steel flanges designed as quartz-to-hose type connectors.

A carrier gas source 114 is in fluid communication with the volume of the quartz tube 106. The carrier gas source 114 is coupled to a gas flow controller 112 via a first conduit 116.

A second conduit 122 couples the gas flow controller 112 to the volume of the quartz tube 106. A flow path 118 of the carrier gas extends from the carrier gas source 114 to the gas flow controller 112 via the first conduit 118 and a flow path 120 of the carrier gas extends from the gas flow controller 112 to the volume of the quartz tube 106 via the second conduit 122

Figure 2:
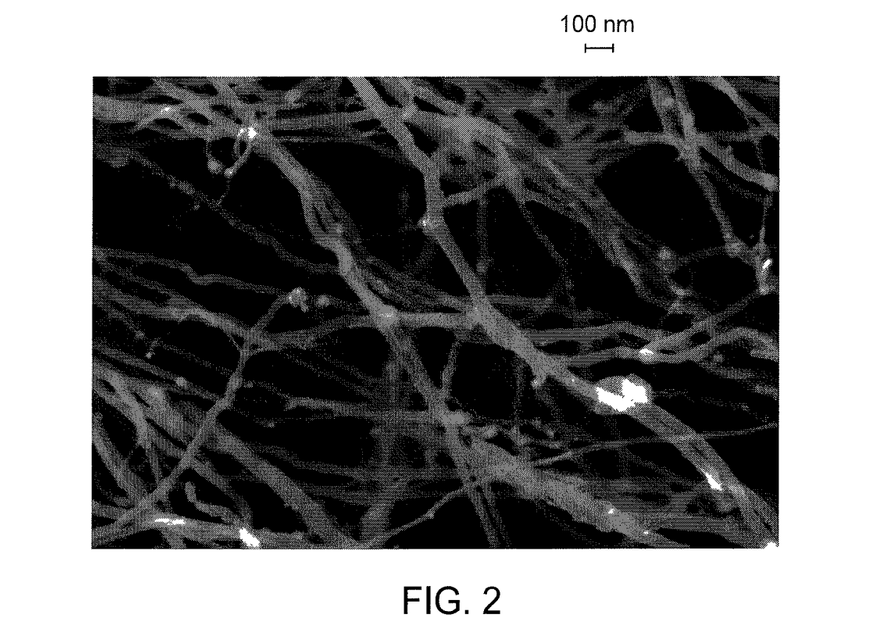
FIG. 2 is a scanning electron microscope image (magnification 40000) of a carbon nanomaterial produced according to an embodiment described herein.

FIG. 2 is a scanning electron microscope image (magnification 40,000×) of a carbon nanomaterial produced according to an embodiment described herein. The image of FIG. 2 are from materials produced according to example 12 described in greater detail hereinafter. The image was taken by JEOL 7800 FEG SEM at 5 kV and a probe current of 6 pA. Copper sticky tape was used as the base. A diameter of CNTs formed by the methods described herein were measured by analyzing the distances in ImageJ.

Figure 3:
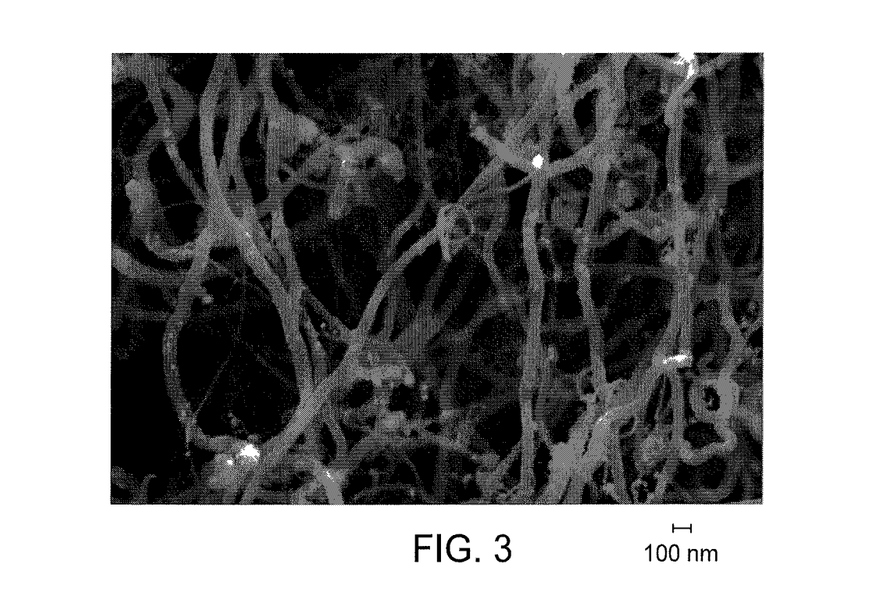
FIG. 3 is scanning electron microscope (magnification 33000×) of a carbon nanomaterial produced according to an embodiment described herein.

FIG. 3 is scanning electron microscope (magnification 33,000×) of a carbon nanomaterial produced according to an embodiment described herein. The image of FIG. 3 are from materials produced according to example 6 (using toluene as a control) described in greater detail hereinafter. The image was taken by JEOL 7800 FEG SEM at 5 kV and probe current of 6 pA. Sticky copper tape was used as the base. The diameter of the CNTs were measured by analyzing the distances in ImageJ.

Figure 4:
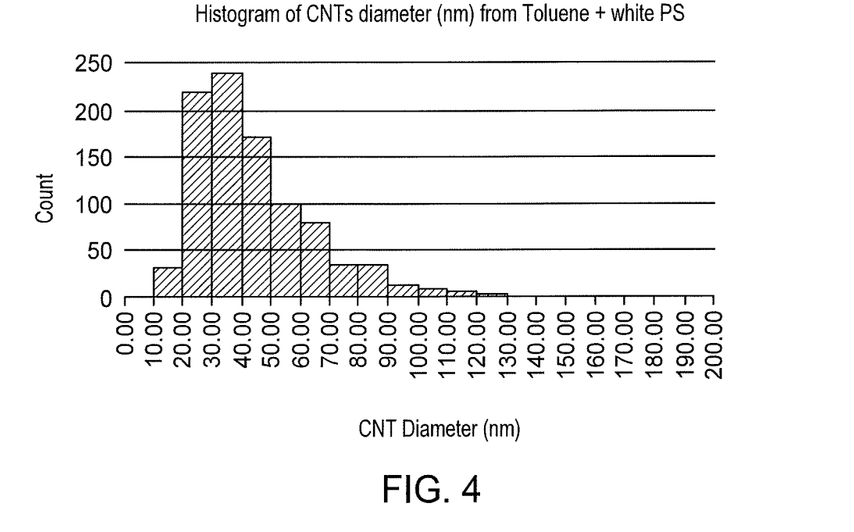
FIG. 4 is a histogram of CNT diameters for a sampling of CNT materials formed according to an embodiment described herein.

FIG. 4 is a histogram of CNT diameters for a sampling of CNT materials formed according to an embodiment described herein. More specifically, the CNTs were made using white polystyrene as the feedstock as described in examples 11-16 discussed in greater detail hereinafter. Images of least magnification of 30,000× were taken by JEOL 7800 FEG SEM in order to increase the accuracy of the measurements and 940 diameter measurements were carried out. The diameters of the CNTs were measured by analyzing the distances in ImageJ. The histogram shows that the diameter range of 20-70 nm is common for the CNTs grown from toluene and white polystyrene.

Figure 5:
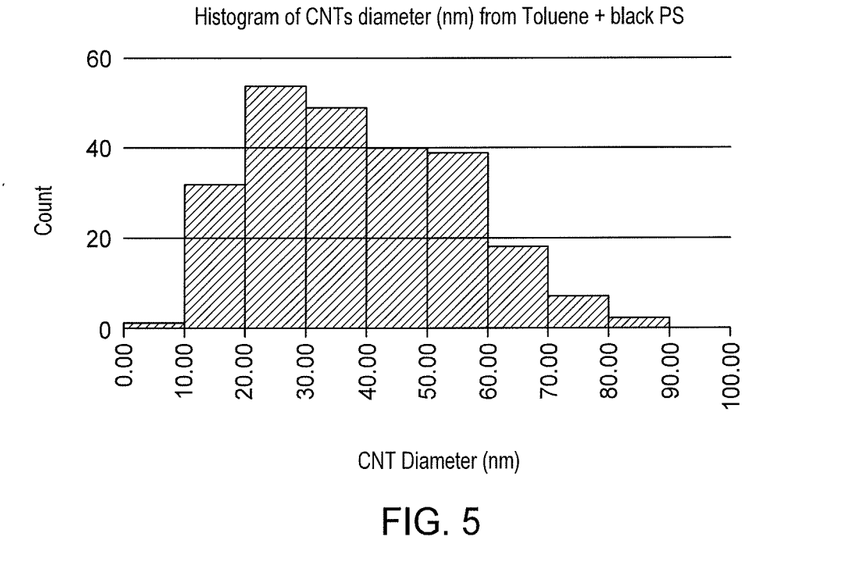
FIG. 5 is a histogram of the recorded CNT diameters for a sampling of CNT materials formed according to an embodiment described herein.

FIG. 5 is a histogram of the recorded CNT diameters for a sampling of CNT materials formed according to an embodiment described herein. More specifically, the CNTs were made using black polystyrene materials as described in examples 17-20 and discussed in greater detail hereinafter. Images of least magnification of 30,000× were taken by JEOL 7800 FEG SEM in order to increase the accuracy of the measurements and 243 diameter measurements were carried out. The diameters of the CNTs were measured by analyzing the distances in ImageJ. The histogram shows that the diameter range of 10-60 nm is common for the CNTs grown from toluene and black polystyrene which show a smaller range compared to the CNTs made from toluene and white polystyrene (FIG. 4).

Figure 6:
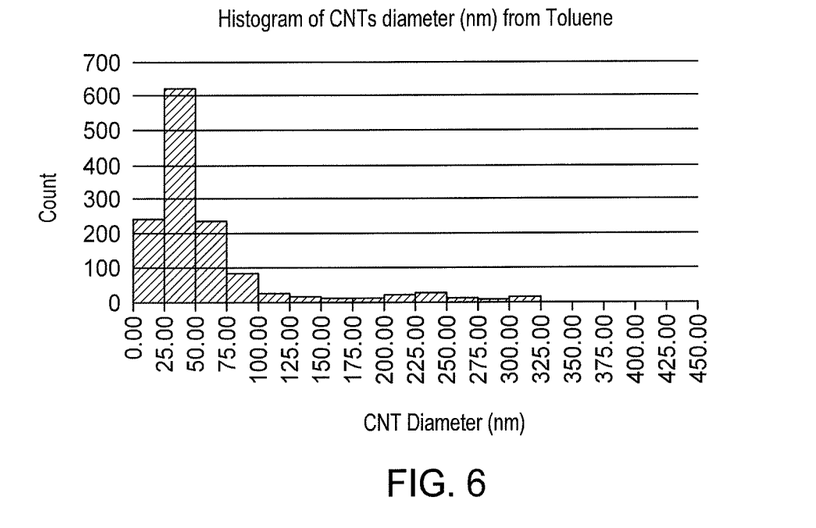
FIG. 6 is a histogram of the recorded CNT diameters for a sample of CNT materials formed according to an embodiment described herein.

FIG. 6 is a histogram of the recorded CNT diameters for a sample of CNT materials formed according to an embodiment described herein. More specifically, the CNTs were made using solvent (no additional solid feedstock) as described in examples 1-10 and discussed in greater detail hereinafter. Images of least magnification of 30,000× were taken by JEOL 7800 FEG SEM in order to increase the accuracy of the measurements and 1355 diameter measurements were carried out. The diameters of the CNTs were measured by analyzing the distances in ImageJ. The histogram shows that the diameter range of less than about 75 nm is common for the CNTs grown from solely solvent (toluene).

Figure 7:
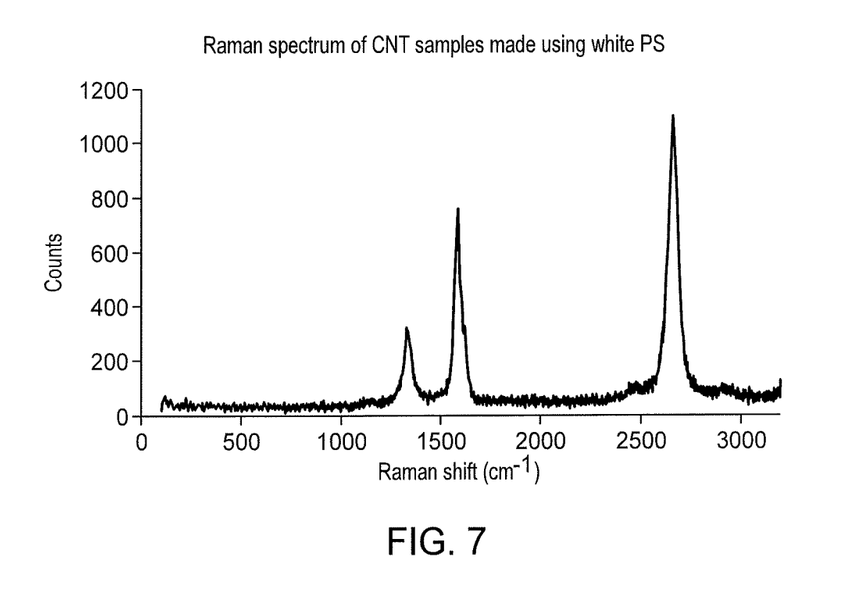
FIG. 7 is a graph illustrating Raman spectra of CNT materials formed according to an embodiment described herein.

FIG. 7 is a graph illustrating Raman spectra of CNT materials formed according to an embodiment described herein. More specifically, the CNTs were made using white polystyrene plastic feed stock as described in example 12 discussed in greater detail hereinafter. The Raman spectrum was acquired in an inVia confocal Renishaw Raman instrument using a 633 nm wavelength laser, an exposure time of 10 seconds, and laser power of 5%. The spectrum was accumulated one time.

Figure 8:
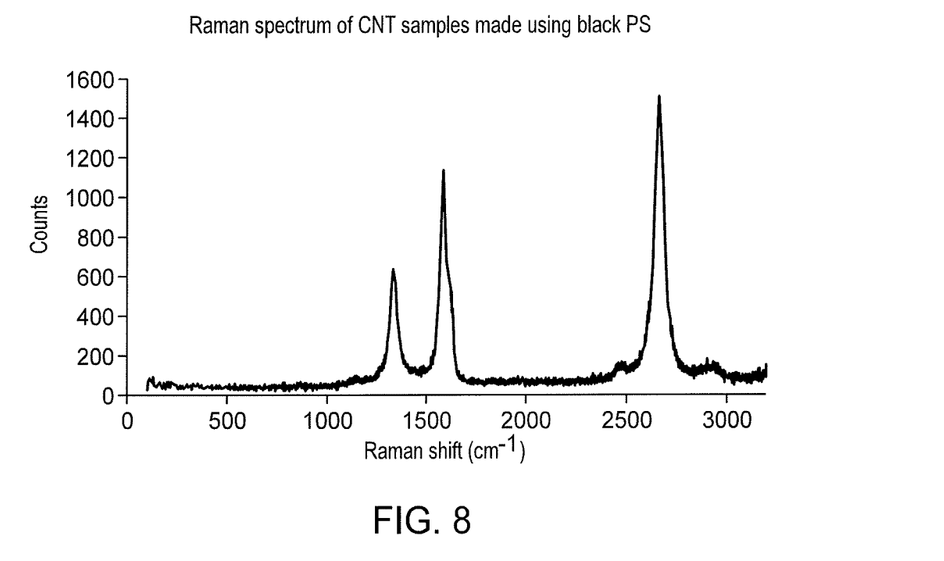
FIG. 8 is a graph illustrating Raman spectra of CNT materials formed according to an embodiment described herein.

FIG. 8 is a graph illustrating Raman spectra of CNT materials formed according to an embodiment described herein. More specifically, the CNTs were made using black polystyrene plastic as described in example 17 and discussed in greater detail hereinafter. The Raman spectrum was acquired in an inVia confocal Renishaw Raman instrument using a 633 nm wavelength laser, an exposure time of 10 seconds, and laser power of 5%. The spectrum was accumulated one time.

Figure 9:
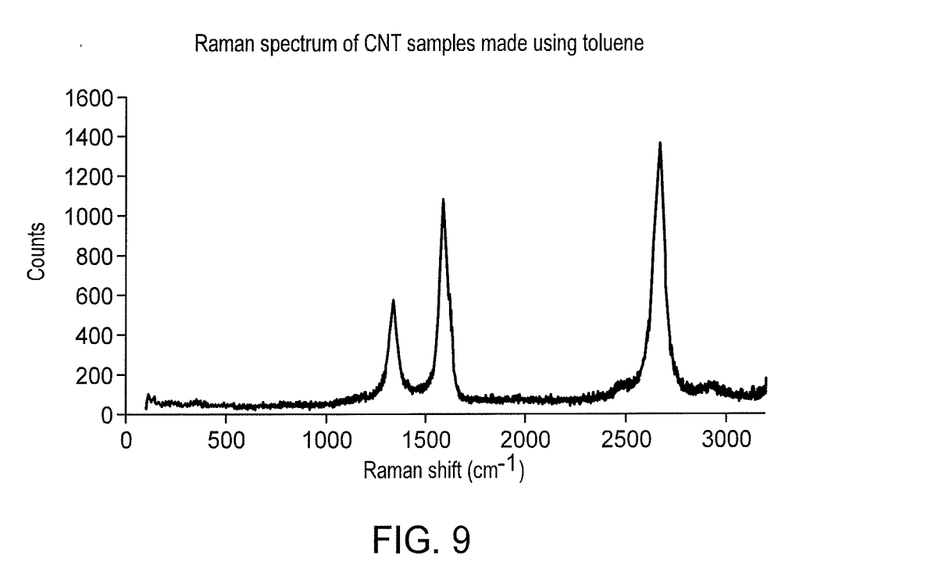
FIG. 9 is a graph illustrating Raman spectra of a control growth using toluene as solvent according to an embodiment described herein.

FIG. 9 is a graph illustrating Raman spectra of a control growth using toluene as solvent according to an embodiment described herein. More specifically, the CNTs were made using toluene as solvent as described in example 6 and discussed in greater detail hereinafter. The Raman spectrum was acquired in an inVia confocal Renishaw Raman instrument using a 633 nm wavelength laser, an exposure time of 10 seconds, and laser power of 5%. The spectrum was accumulated one time.

Figure 10:
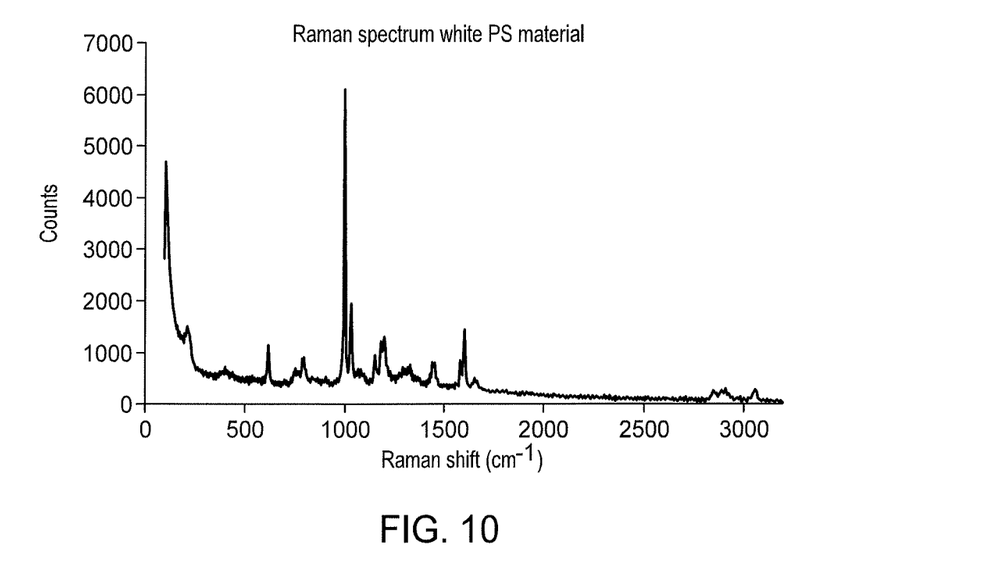
FIG. 10 is a graph illustrating Raman spectra of white polystyrene material that is a feedstock for CNT growth according to an embodiment described herein.

FIG. 10 is a graph illustrating Raman spectra of white polystyrene material that is a feedstock for CNT growth according to an embodiment described herein. The Raman spectrum was acquired in an inVia confocal Renishaw Raman instrument using a 785 nm wavelength laser, an exposure time of 10 seconds, and laser power of 0.5%. The spectrum was accumulated one time. A 785 nm wavelength laser was chosen since polystyrene is decomposed under shorter laser wavelengths and decreasing the power to less than 0.05% (in case of 633 nm) would cause very weak peaks to appear.

Figure 11:
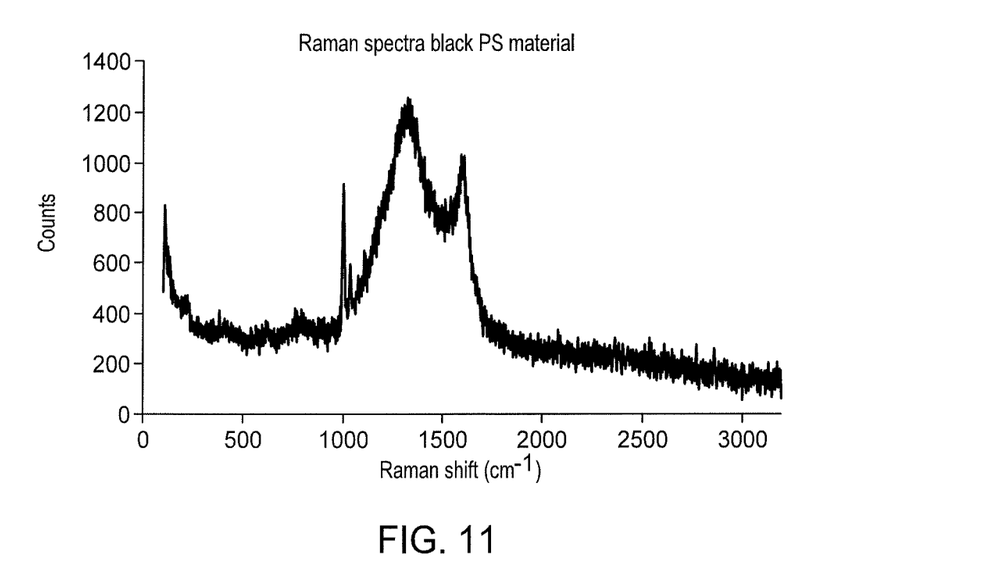
FIG. 11 is a graph illustrating Raman spectra of black polystyrene material that is a feedstock for CNT growth according to an embodiment described herein.

FIG. 11 is a graph illustrating Raman spectra of black polystyrene material that is a feedstock for CNT growth according to an embodiment described herein. The Raman spectrum was acquired in an inVia confocal Renishaw Raman instrument using a 785 nm wavelength laser, an exposure time of 10 seconds, and laser power of 0.5%. The spectrum was accumulated three times. Lower laser power (0.1%) was applied as black polystyrene was decomposed at higher laser powers. 785 nm wavelength laser was chosen since polystyrene is decomposed under shorter laser wavelengths and decreasing the power to less than 0.05% (in case of 633 nm) will cause very week peaks to appear.

Figure 12:
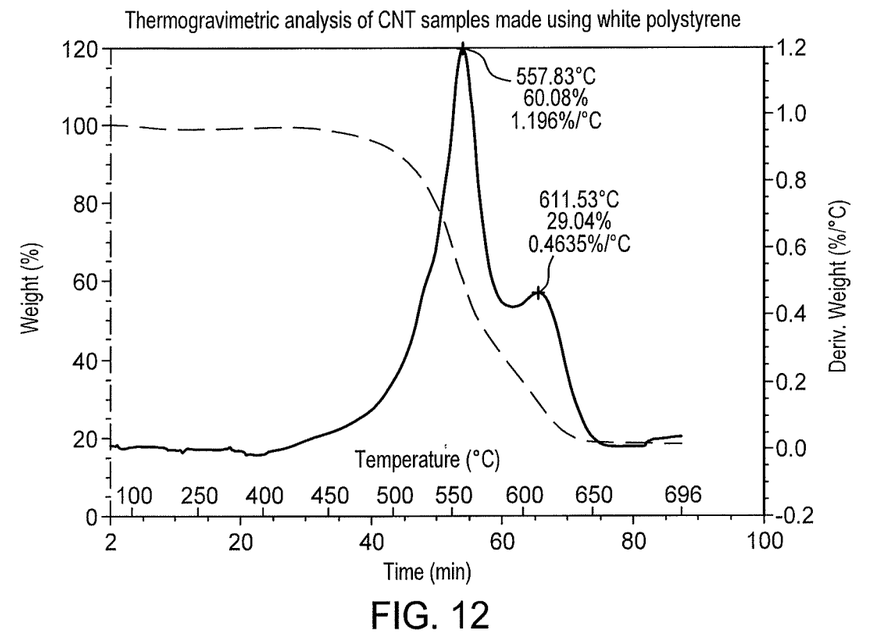
FIG. 12 is a graph illustrating thermogravimetric analysis (TGA) data of carbon nanotube materials made using white polystyrene according to an embodiment described herein.

FIG. 12 is a graph illustrating thermogravimetric analysis (TGA) data of carbon nanotube materials made using white polystyrene according to an embodiment described herein. TGA was carried out in a TA Instruments SDT Q600 TGA instrument. CNT samples were made as described in example 11 discussed in greater detail hereinafter. 5 mg of CNT sample was placed in an alumina cup and TGA was run under 100 mL/min air flow. Two ramping stage were applied. First, the sample was heated up to 400° C. ramping at 20° C./min. Then the ramping rate was decreased to 5° C./min and the temperature was increased to 750° C. so that all the carbon species were burned and iron oxide was left. The TGA chamber was cooled down to room temperature running 5 mL/min argon therethrough. The weight loss (directly interpreted as carbon content of the sample), first derivative weight percent, and the lowest temperature at which the weight loss started were among the data acquired. The two peaks seen in FIG. 12 are indicative of two types of carbon materials. According to SEM images, the first peak can be attributed to the narrower diameter range of CNTs that are oxidized at lower temperature (557° C.) and afterwards the thicker CNTs (larger diameter) were oxidized at higher temperature (611° C.). TGA shows that at least 81% (weight) of the sample are carbon nanomaterials.

Figure 13:
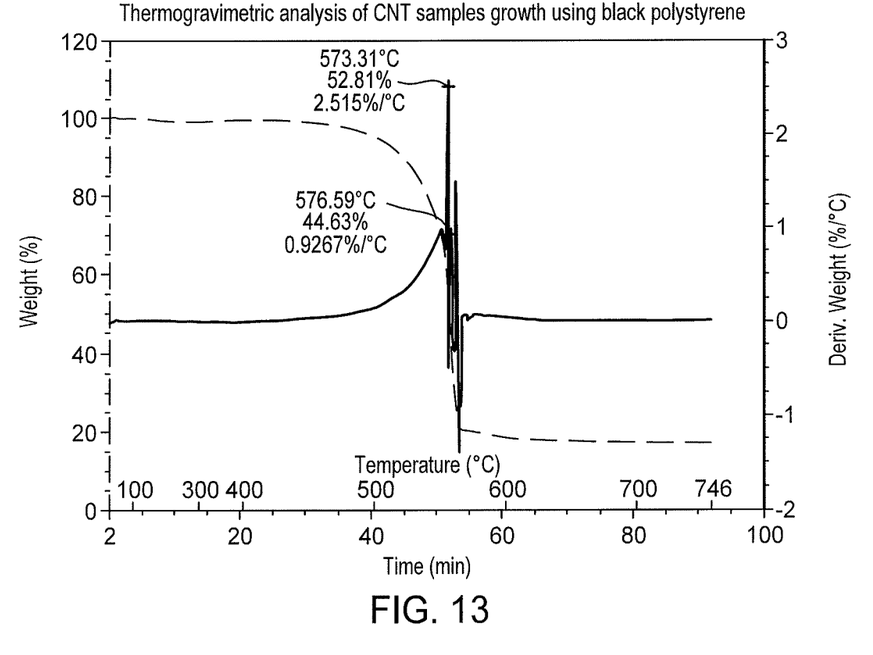
FIG. 13 is a graph illustrating thermogravimetric analysis data of carbon nanotube materials made using black polystyrene according to an embodiment described herein.

FIG. 13 is a graph illustrating thermogravimetric analysis data of carbon nanotube materials made using black polystyrene according to an embodiment described herein. TGA was carried out in a TA Instruments SDT Q600 TGA instrument. CNT samples were made as described in example 17 discussed in greater detail hereinafter. 5 mg of CNT sample was placed in an alumina cup and TGA was run under 100 mL/min air flow. Two ramping stage were applied. First, the sample was heated up to 400° C. ramping at 20° C./min. Then the ramping rate was decreased to 5° C./min and the temperature was increased to 750° C. so that all the carbon species were burned and iron oxide was left. The TGA chamber was cooled down to room temperature running 5 mL/min argon therethrough. The weight loss (directly interpreted as carbon content of the sample), first derivative weight percent, and the lowest temperature at which the weight loss started were among the data acquired. A small peak is seen at 550° C. following by two peaks at 576° C. and 573° C. Compared to FIG. 12, this can be attributed to the narrower diameter range of CNTs made from black polystyrene. Such results are confirmed according to the histograms of the CNT diameters (FIGS. 4 and 5).

Figure 14:
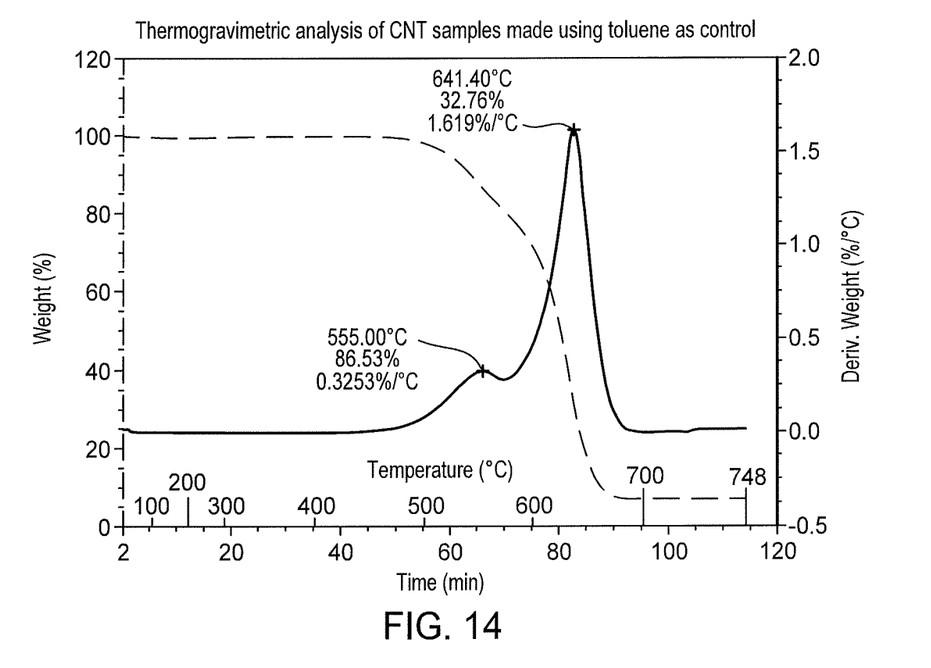
FIG. 14 is a graph illustrating thermogravimetric analysis data of carbon nanotube materials made using a solvent according to an embodiment described herein.

FIG. 14 is a graph illustrating thermogravimetric analysis data of carbon nanotube materials made using a solvent according to an embodiment described herein. TGA was carried out in a TA Instruments SDT Q600 TGA instrument. CNT samples were made as described in example 1 discussed in greater detail hereinafter. 5 mg of CNT sample was placed in an alumina cup and TGA was run under 100 mL/min air flow. Two ramping stage were applied. First, the sample was heated up to 400° C. ramping at 20° C./min. Then the ramping rate was decreased to 5° C./min and the temperature was increased to 750° C. so that all the carbon species were burned and iron oxide was left. The TGA chamber was cooled down to room temperature running 5 mL/min argon therethrough. The weight loss (directly interpreted as carbon content of the sample), first derivative weight percent, and the lowest temperature at which the weight loss started were among the data acquired.

EXAMPLES

Example 1

The liquid carbon source was injected into the quartz tube 106 in the first zone 108 of the furnace 128 for evaporation using a micro pump and an injector 102 equipped with a 9" Hamilton needle 104 of Gauge 26 point style 2. The volume of the quartz tube 106 was purged with a carrier gas composed of 5% hydrogen in 95% argon. Purging was carried out using a flow of gas at 1 L/min. Prior to injection of the solution, the first and second zones 108, 110 respectively, were heated 225° C. and 776° C., respectively, while purging with the carrier gas. The injection rate was set at 3.6 mL per hour and 3 mL of the solution was injected into the quartz tube 106. After the growth stage, the reactor was cooled down to the room temperature while the carrier gas was running through the quartz tube 106. The product of the growth was physically removed from the inside walls of the quartz tube 106. A mass of black powdered product was about 440 mg.

Raman spectroscopy was used to determine the quality of the materials and to verify that CNTs were created. Measurement acquired at a laser wavelength of 633 nm clearly showed a sharp 2D peak indicative of the existence of carbon nanotubes. The G/D ratio was calculated by using the peak heights of the G and D peaks respectively. The values were found to range from 1.65 to 2.15. The scanning electron images (SEM) images were obtained using a JEOL 7800F FEG and image analysis showed a mean CNT diameter of 39 nm. By using thermogravimetric analysis, the peak of weight loss in TGA (under 100 mL/min air) appeared at 583° C. The TGA showed 96% carbon content (4% iron oxide residue) at 750° C. which showed very high purity of the sample in terms of carbon nanomaterials. The typical yield of the CNT products (ratio of the mass of product to the mass of injected carbon) measured 17% on average.

Example 2

The procedure explained in example 1 was followed except that CNTs were grown at 780° C. and the injection rate was set at 3.6 mL/hr (3 mL injected).

Example 3

The procedure explained in example 1 was followed except that CNTs were grown at 900° C., the injection rate was 2 mL/hour, and 1 mL of the solution was injected. The SEM image analysis proved that the diameter of CNTs increased significantly and ranged between 80-140 nm. The TGA peak at the same conditions as explained in example 1 appeared at a higher temperature of 641° C. which can be attributed to the thicker CNTs or Carbon Nano Fibers (CNF). However, the maximum G/D ratio acquired by Raman spectroscopy using the 633 nm wavelength laser was 3.61.

Example 4

The procedure explained in example 3 was followed except that 5 mL of the solution was injected.

Example 5

The procedure explained in example 2 was followed except that a needle of Gauge 20 was used (316 stainless steel, 8" long, point style 2 provided by Sigma-Aldrich) and 5 mL of the solution was injected at the rate of 4.2 mL/h.

Example 6

The procedure explained in example 2 was followed and the solution was injected into the quartz tube 106 at different rates of 2.25, 4.2, 5, and 10 mL/hr (injected volume 1.8, 4, 2, and 13.5 mL, respectively). Yield of product was found to be between 5-10%.

Example 7

The procedure explained in example 2 was followed except that 2 mL of the solution was injected.

Example 8

The procedure explained in example 2 was followed but the carrier gas flow rate was decreased by 50% and set at 0.5 L/min. The change in flow rate of the carrier directly affects the available hydrogen in the growth atmosphere which can change the kinetics and dynamics of the metal nanoparticle (iron) reduction to metallic state and growth of carbon nanomaterials.

Example 9

The procedure explained in example 5 was followed except that 20 mL of the solution was injected at 5 mL/h.

Example 10

The procedure explained in example 9 was followed except that the injection rate was increased to 10 mL/h.

Example 11

The same conditions as example 2 were utilized in example 11. For solution preparation, 860 mg of white polystyrene (PS) was cut into small pieces and was added to 30 mL of toluene (Tol), equivalent to 4.9% w/w, that was used in example 1 and was ultra-sonicated for 15 minutes at 40° C. in a water bath to ensure the dissolution of polystyrene in toluene. Then, ferrocene was added to the solution according to example 1. Under 1 L/min of carrier gas, the first and second zones 108, 110, respectively, of the reaction vessel 100 were set at 250° C. and 780° C., respectively. 5 mL of Tol+PS was injected at the rate of 4.2 mL/h. A Hamilton needle gauge 26 was used. 10 mg of CNTs were obtained from this experiment with a mean diameter of 33 nm. A G/D ratio of the narrower diameter of the CNTs made by Tol+PS was also confirmed by TGA where the weight loss peak appeared at 558° C. which is lower than that of example 2.

Example 12

Using similar conditions as example 11, the Tol+PS solution of example 11 was diluted 10 times before the growth reaction. 1 mL of the Tol+PS solution prepared according to example 11 was added to 9 mL of toluene and an adequate amount of ferrocene was added to keep 5% w/w of catalyst. The first zone temperature was set to 300° C. to stay well above the melting and evaporation temperature of PS but below the decomposition (pyrolysis) temperature to ensure that PS is carried to the growth zone in gas phase. TGA of PS under 5% $H_2$/95% Ar and 5° C./min ramping showed decomposition and 80% weight loss at 403° C. 5 mL of Tol+PS was injected at 4.2 mL/h. 980 mg of CNTs were obtained accounting for a 23% product yield.

Example 13

The procedure explained in example 12 was followed but for preparation of Tol+PS solution, 100 mg of white PS was dissolved in 20 mL of toluene (0.6% w/w). Less PS was added to toluene to decrease the viscosity of the Tol+PS solution running through the needle 104. 510 mg of CNTs were obtained accounting for a 12% product yield.

Example 14

The procedure explained in example 13 was followed except that the injection rate was set at 3.75 mL/h and 10 mL of the Tol+PS solution was injected into the liquid injection reactor to grow CNTs. The yield decreased to 7% (620 mg of CNTs).

Example 15

The procedure explained in example 14 was followed but the injection rate was increased to 5 mL/h. 920 mg of product was obtained corresponding to an 11% product yield.

Example 16

This example utilizes the Tol+PS solution made according to example 11 and a needle of Gauge 20. 2 mL of the Tol+PS solution of example 11 was added to 18 mL of toluene to make a 20 mL of the Tol+PS solution. Enough ferrocene was added to keep the concentration consistent (5% w/w catalyst). All 20 mL solution was injected into the liquid injection reactor for CNT growth at 10 mL/h rate. 667 mg of CNTs were obtained which accounts for a 4% product yield.

Example 17

The sample procedure of example 13 was followed but instead black polystyrene food packaging material was used. Needle gauge 26 was used to inject 5 mL of the Tol+PS solution at 4.2 mL/h. A product yield of 10% was reached (450 mg CNTs).

Example 18

The procedure explained in example 17 was followed for Tol+PS (black PS) preparation but 10 mL of the Tol+PS was injected at the rate of 12 mL/h.

Example 19

400 mg black PS was dissolved in 20 mL toluene (2.3% w/w) as the carbon source to grow CNTs. The needle gauge 20 of example 5 was used and the carrier gas flow rate was set at 0.5 L/min. The injection rate was 5 mL/h and 20 mL of Tol+PS was injected. 1500 mg of CNTs were produced accounting for an 8% product yield.

Table 1 illustrates a list of values obtained using Raman spectroscopy of samples made using each of the aforementioned examples.

TABLE 1

| Sample | Median G:D ratio (a.u.) | Maximum G:D ratio (a.u.) | Mean G:D ratio (a.u.) |
| --- | --- | --- | --- |
| EXAMPLE 1 | 1.765 | 2.14 | 1.83 |
| EXAMPLE 2 | 2.15 | 2.27 | 2.11 |
| EXAMPLE 3 | — | — | — |
| EXAMPLE 4 | 2.42 | 3.61 | 2.6025 |
| EXAMPLE 5 | 1.755 | 1.8 | 1.7375 |
| EXAMPLE 6 | 1.88 | 2.48 | 1.9075 |
| EXAMPLE 6 | 1.805 | 1.95 | 1.7875 |
| EXAMPLE 6 | 1.49 | 1.66 | 1.4575 |
| EXAMPLE 6 | 0.945 | 1.22 | 0.9525 |
| EXAMPLE 7 | 2.02 | 2.3 | 1.945 |
| EXAMPLE 8 | 2.21 | 2.43 | 2.1775 |
| EXAMPLE 9 | 1.66 | 1.79 | 1.65 |
| EXAMPLE 10 | 1.735 | 1.9 | 1.6575 |
| EXAMPLE 11 | 1.565 | 1.93 | 1.6 |
| EXAMPLE 12 | 2.155 | 2.41 | 2.085 |
| EXAMPLE 13 | 1.445 | 1.66 | 1.425 |
| EXAMPLE 14 | 1.77 | 1.92 | 1.67 |
| EXAMPLE 15 | 1.945 | 2.13 | 1.9225 |
| EXAMPLE 16 | 1.65 | 1.77 | 1.5475 |

TABLE 1-continued

| Sample | Median G:D ratio (a.u.) | Maximum G:D ratio (a.u.) | Mean G:D ratio (a.u.) |
|---|---|---|---|
| EXAMPLE 17 | 2.015 | 2.39 | 1.9725 |
| EXAMPLE 18 | 1.485 | 1.86 | 1.5175 |
| EXAMPLE 19 | 1.575 | 2.06 | 1.665 |

While the foregoing is directed to embodiments of the present disclosure, other and further embodiments of the disclosure may be devised without departing from the basic scope thereof, and the scope thereof is determined by the claims that follow.

What is claimed is:

1. A method of converting waste plastic to carbon nanotubes, comprising:
    mixing a carbon-containing material and a metallic catalyst precursor with a solvent to form a mixture, wherein the carbon-containing material is a waste plastic comprising about 0.10 to about 10 weight percent of the mixture;
    injecting the mixture into a carrier gas stream and into a heated reaction vessel comprising a plurality of heating zones;
    heating the mixture at a first temperature of between about 100° C. and about 1000° C.;
    heating the mixture at a second temperature of between about 400° C. and about 1000° C. to facilitate growth of carbon nanotubes; and
    removing the carbon nanotubes from the heated reaction vessel.

2. The method of claim 1, wherein the removing the carbon nanotubes from the reaction vessel is performed concurrently with the growth of the carbon nanotubes.

3. The method of claim 1, further comprising:
    cooling the heated reaction vessel to about room temperature; and
    ceasing flow of the carrier gas stream prior to removal of the carbon nanotubes from the cooled reaction vessel.

4. The method of claim 1, wherein the carrier gas comprises hydrogen.

5. The method of claim 4, wherein the carrier gas further comprises one or more of argon, helium, and nitrogen.

6. The method of claim 5, wherein a flow rate of the carrier gas is between about 0.001 L/min and about 500 L/min.

7. The method of claim 1, wherein the metallic catalyst precursor is soluble in the solvent.

8. The method of claim 7, wherein the metallic catalyst precursor contains one or more of an iron containing material, a nickel containing material, a cobalt containing material, a molybdenum containing material, a copper containing material, a zinc containing material, a gallium containing material, or a ruthenium containing material.

9. The method of claim 8, wherein the metallic catalyst precursor is ferrocene.

10. The method of claim 8, where a concentration of the metallic catalyst precursor in the mixture is between about 0.01 to about 50 weight percent based on the amount of carbon-containing material used.

11. The method of claim 1, wherein the waste plastic selected from the group consisting of polyvinyl chloride, polystyrene, bisphenol A resins, low density polyethylene, polypropylene, polymer resins, polyurethane, olefins, polyolefins, elastomers, and combinations thereof.

12. The method of claim 1, wherein the solvent disperses or dissolves the carbon-containing material.

13. The method of claim 12, wherein the solvent is selected from the group consisting of toluene, xylene, benzene, acetone, dimethyl sulfoxide (DMSO), dichloromethane, chloroform, isopropyl alcohol, benzyl alcohol, ethanol, bioethanol, methanol, biofuels, dimethylformamide (DMF), decaline, p-xylene, m-cresol, o-cresol, nitrobenzene, phenol, chlorophenol, and combinations thereof.

14. The method of claim 12, wherein the solvent is a waste contaminated solvent.

15. The method of claim 14, wherein the solvent is a hydrocarbon containing material.

16. The method of claim 1, wherein the solvent, the carbon-containing material, and the metallic catalyst precursor mixture is injected into the reaction vessel at a rate of between about 0.001 mL/min to about 100 mL/min.

17. A method of converting waste plastic to carbon nanotubes, comprising:
    mixing waste plastic and ferrocene with a solvent to form a mixture, the waste plastic comprising about 0.10 to about 10 weight percent of the mixture;
    injecting the mixture into a carrier gas stream and into a reaction vessel, the reaction vessel including a quartz tube comprising a first heating zone and a second heating zone;
    heating the mixture at a first temperature of between about 100° C. and about 1000° C. in the first heating zone;
    heating the mixture at a second temperature of between about 400° C. and about 1000° C. in the second heating zone to facilitate growth of carbon nanotubes; and
    removing the carbon nanotubes from the reaction vessel.

18. The method of claim 17, wherein the waste plastic selected from the group consisting of polyvinyl chloride, polystyrene, bisphenol A resins, low density polyethylene, polypropylene, polymer resins, polyurethane, olefins, polyolefins, elastomers, and combinations thereof.

19. A method of converting waste plastic to carbon nanotubes, comprising:
    mixing carbon-containing material and a metallic catalyst precursor with toluene to form a mixture, wherein the carbon-containing material is a waste plastic comprising about 0.10 to about 10 weight percent of the mixture;
    injecting the mixture into a carrier gas stream and into a reaction vessel comprising a first heating zone and a second heating zone, the first heating zone and the second heating zones disposed adjacent to one another along a length of a quartz tube;
    heating the mixture at a first temperature of between about 100° C. and about 1000° C. in the first heating zone;
    heating the mixture at a second temperature of between about 400° C. and about 1000° C. in the second heating zone to facilitate growth of carbon nanotubes on the quartz tube within the second heating zone; and
    removing the carbon nanotubes from the reaction vessel.

* * * * *